No. 678,768. Patented July 16, 1901.
F. C. SHERMAN.
STEAM COOKING VESSEL.
(Application filed Jan. 23, 1901.)

(No Model.)

WITNESSES
T. T. Massey
Elliot J. Stoddard

INVENTOR
Frank C. Sherman
By Parker & Burton
Attorneys.

UNITED STATES PATENT OFFICE.

FRANK C. SHERMAN, OF PONTIAC, MICHIGAN.

STEAM COOKING VESSEL.

SPECIFICATION forming part of Letters Patent No. 678,768, dated July 16, 1901.

Application filed January 23, 1901. Serial No. 44,438. (No model.)

*To all whom it may concern:*

Be it known that I, FRANK C. SHERMAN, a citizen of the United States, residing at Pontiac, county of Oakland, State of Michigan, have invented a certain new and useful Improvement in Steam Cooking Vessels; and I declare the following to be a full, clear, and exact description of the invention, such as will enable others skilled in the art to which it pertains to make and use the same, reference being had to the accompanying drawings, which form a part of this specification.

This invention relates to steam-cookers, and has for its object an improved cooking utensil in which the cooking is done by steam produced primarily in a chamber at the base of the utensil and flowing from thence into a higher chamber, in which the article to be cooked is placed.

Figure 1:
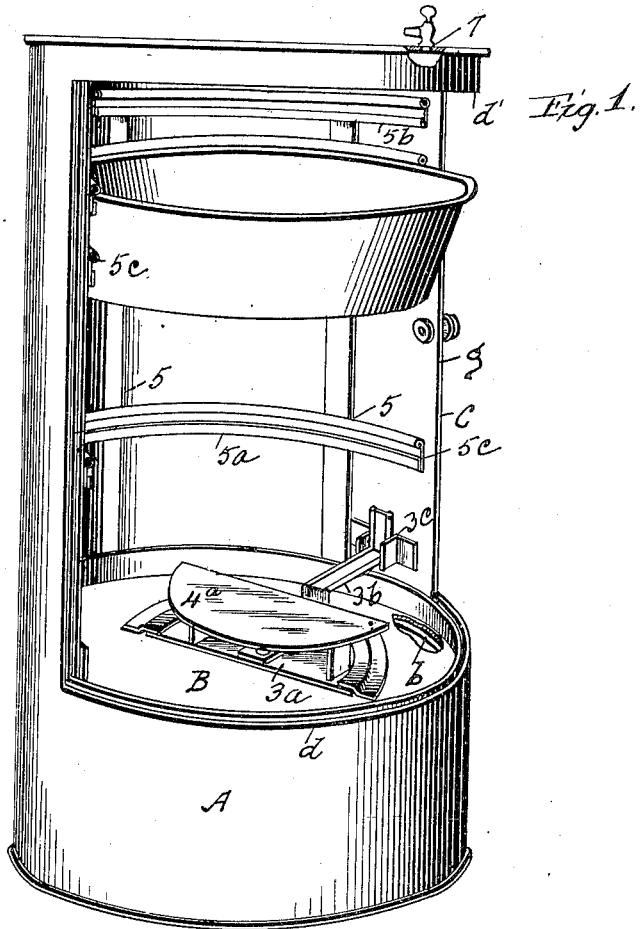
Figure 2:
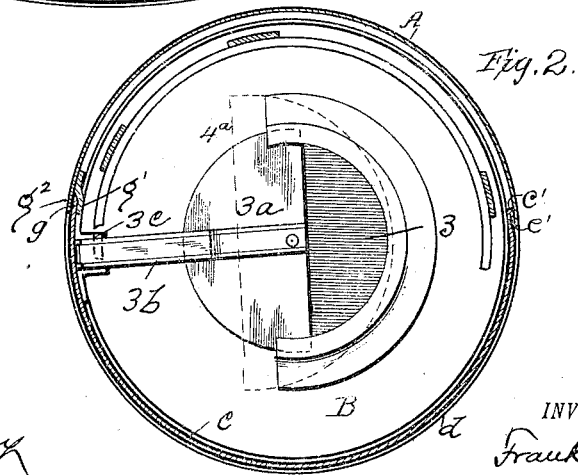

In the drawings, Figure 1 shows the cooking utensil in perspective. Fig. 2 is a cross-section taken horizontally and about midway of the height of the vessel, the deflector-plate being removed to show more distinctly the parts under it, but its position being indicated by dotted lines.

The vessel consists of an outside casing A, the bottom of which constitutes a chamber for the reception of water. The bottom surface is preferably flat and arranged to set or rest on the top of the stove, although it may be, if desired, arranged to engage in the hole of a stove-top. Around the inside of the vessel and near the top of that portion which is employed as a water-receptacle is a flange $b$, the purpose of which is to support a cover B, that covers in and incloses the water in the water-chamber of the utensil. The cover does not fit so closely but that any water formed from condensed steam can flow back into the water-chamber; but it does fit so closely as to prevent a large flow of steam during times when the door of the utensil is open, as hereinafter specified.

C indicates the door, which occupies a space of nearly half the circumference and is in itself nearly half-cylindrical with open ends. The curved upper and lower ends of the door fit in grooved circular guideways, one of which, $d$, is at the bottom of the cooking part of the utensil and the other of which, $d'$, is near the extreme top of the utensil. The door is fitted with a flange $c'$ on its rearmost side, that engages under a corresponding inturned flange $e'$ on the wall A of the utensil. The front edge $g$ of the door engages between vertical frame-pieces $g'$ $g^2$ on the casing.

The cover B is provided at its center with an opening 3, that is in shape the segment of a circle, and over this is fitted a rotary valve or cover $3^a$, with an arm $3^b$ extending therefrom, and the arm $3^b$ engages in a stirrup $3^c$ on the door C. When the door is open in the position shown in Fig. 1, the opening 3 is closed by the cover $3^a$; but as the door C is brought to its closed position it swings the arm $3^b$ with it and opens the passage 3, so that the steam formed in the lower chamber can pass freely up into the upper chamber. The opening 3 is shown as having the form of a semicircle, and the valve $3^a$ has a similar form. Above the valve $3^a$ and parallel thereto is a deflector $4^a$, which is secured to the valve $3^a$ and is so located that it shall occupy a position when said valve is open above the position occupied by the valve when in its closed position.

On the cover B is a rack 5 of two or more curved rests $5^a$ and $5^b$, each of the rests being preferably a little more than a semicircle and each of them being provided with an end $5^c$, that extends beyond the upright support and is closed in, so that the distance between the free ends of the supports is less than the diameter, but sufficient to enable a flanged dish, as a baking dish or pan, to be slipped between the ends and brought to a position of rest and supported on the curved supporting-piece. The number of dish-supports is not material to the construction, but may be any number from one upward, and each support is adapted to hold a dish free from all underlying matters in contact with it and in a position to expose the entire surface of the dish to the heated steam. A vent 7 is provided through the top of the vessel.

Whenever it is desirable to inspect the contents of the utensil during the operation of cooking, it can readily be done by opening the door, at which time the inflow of steam into the vessel is for the time being stopped entirely or almost entirely and the interior of the vessel is for the instant free from steam, so that the contents may be readily inspected and steam will not escape to injure the person making the inspection.

What I claim is—

1. In a steam cooking utensil, the combination of a water-chamber, a cover therefor having an aperture through it, a valve adapted to be moved into a position to close said aperture and into a position such that it shall not close said aperture, a cooking-chamber above the water-chamber having an opening through its wall, a sliding door adapted to close said opening and form a portion of said wall, said door and valve being connected together so as to maintain the same relative position, all arranged so that the aperture through said cover shall be open when the door is closed, and closed when the door is open, substantially as described.

2. In a steam cooking utensil, the combination of a water-chamber, a cover therefor having an aperture through it, a valve adapted to be moved into a position to close said aperture and into a position such that it shall not close said aperture, a plate located above said valve and attached thereto, said plate extending beyond said valve so as to be above said aperture when the valve is open, a cooking-chamber above the water-chamber having an opening through its wall, a sliding door adapted to close said opening and form a portion of said wall, said door and valve being connected together so as to maintain the same relative position, all arranged so that the aperture through said cover shall be open when the door is closed and closed when the door is open, substantially as described.

3. In a steam cooking utensil, the combination of a water-chamber, a cover therefor having an aperture therethrough a valve adapted to be rotated into a position to close said aperture, and into a position such that it shall not close said aperture, a cylindrical cooking-chamber above the water-chamber having an opening through its cylindrical wall, a door adapted to close said opening and form a portion of said cylindrical wall, and to slide parallel to the rest of the cylindrical wall in opening, said valve and door being connected together so as to retain their relative positions, whereby the valve is closed by the opening of the door, and opened by the closing of the door, substantially as described.

4. In a steam cooking utensil, in combination with a cooking-chamber, a rack provided with curved supports having free terminals adapted to spring slightly to allow the insertion of a dish, substantially as described.

In testimony whereof I sign this specification in the presence of two witnesses.

FRANK C. SHERMAN.

Witnesses:
F. L. PERRY,
R. JAY BRACE.